United States Patent [19]

Knowles

[11] Patent Number: 4,805,175
[45] Date of Patent: Feb. 14, 1989

[54] ULTRA-COMPACT, HAND-HELD LASER SCANNER

[75] Inventor: Carl H. Knowles, Moorestown, N.J.

[73] Assignee: Metrologic Instrumetns, Inc., Bellmawr, N.J.

[21] Appl. No.: 128,299

[22] Filed: Dec. 3, 1987

[51] Int. Cl.[4] ............................................. H01S 3/10
[52] U.S. Cl. ...................................... 372/24; 235/472
[58] Field of Search .................... 372/26, 24; 235/472

[56] References Cited

U.S. PATENT DOCUMENTS

| | | | |
|---|---|---|---|
| D. 281,977 | 12/1985 | Sklaroff | D14/116 |
| 4,387,297 | 6/1983 | Swartz et al. | 235/462 |
| 4,409,470 | 1/1983 | Shepard et al. | 235/472 |
| 4,460,120 | 7/1984 | Shepard et al. | 235/472 |
| 4,496,831 | 1/1985 | Swartz et al. | 235/472 |
| 4,575,625 | 3/1986 | Knowles | 235/467 |
| 4,593,186 | 6/1986 | Swartz et al. | 235/472 |
| 4,607,156 | 8/1986 | Koppenaal et al. | 235/472 |
| 4,673,805 | 6/1987 | Shepard et al. | 235/472 |
| 4,736,095 | 5/1988 | Shepard et al. | 372/26 |

FOREIGN PATENT DOCUMENTS 861301458.5 2/1986 European Pat. Off. .

*Primary Examiner*—Leon Scott, Jr.
*Attorney, Agent, or Firm*—Caesar, Rivise, Bernstein, Cohen & Pokotilow, Ltd.

[57] ABSTRACT

An ultra-compact laser scanner comprising a self-contained housing including a handle portion configured to be readily held within the hand of a person and a short length body portion projecting outward from the handle portion. A subassembly including a laser tube and associated power supply is mounted on a circuit board within the handle and can be readily removed therefrom. A signal processing subassembly is located within the body portion above the handle. A motor and optic system subassembly is also mounted within the body portion and is arranged to direct a beam of laser light from the laser tube through an arc out through a window in the front of the body portion of the housing to sweep across a bar code symbol at which the device is aimed. A beam width adjusting/beam blocking moveable curtain is mounted over the window. Light reflecting off the bar code enters back into the housing through the window, passes through a compact optic path to a photodetector and associated signal processing components so that the bar code scanned is decoded. The device includes a trigger for effecting the scanning operation. The decoded signals are provided via a cable to associated peripheral equipment, such as electronic cash registers, computers, etc.

40 Claims, 3 Drawing Sheets

ULTRA-COMPACT, HAND-HELD LASER SCANNER

BACKGROUND OF THE INVENTION

This invention relates generally to laser scanners and more particularly to hand-held laser scanners.

Various hand-held laser scanners have been disclosed in the following patent literature: U.S. Pat. Nos. 4,387,297 (Swartz et al.), 4,460,120 (Shepherd et al.), 4,496,831 (Swartz et al.), 4,575,625 (Knowles), 4,593,186 (Swartz et al.), and 4,607,156 (Koppenaal et al.); and European Patent Application No. 86.301458.5 (Barkan et al.). In addition, various hand-held laser scanners are available commercially. For example, Metrologic Instruments, Inc., the assignee of the subject invention, has produced and sold an integral, hand-held laser scanner or terminal constructed in accordance with the teachings of my aforementioned U.S. Pat. No. 4,575,625. That device has been sold under the model designation MS 190 and is a very compact erogonomically designed unit.

As described in my aforementioned U.S. Pat. No. 4,575,625, the MS190 hand-held scanner is a completely self-contained unit including means for scanning a bar code, power supplies, a decoding computer to provide a signal indicative of the information contained in the bar code and communication capabilities to enable the uploading/downloading of data to and from the unit. In particular, the unit basically comprises a laser tube, an optic bench assembly, a rotating reflective polygon and associated motor assembly, a photodetector and associated amplifier and signal processing circuitry, a low voltage power supply, a microprocessor and associated circuitry, a high voltage power supply, a releasable input/output cable connector or plug, an associated input/output cable, and an on/off trigger assembly. All of the foregoing components are mounted within a compact, ergonomically designed housing. The housing itself basically comprises a molded plastic body including a cylindrical handgrip portion and a finger opening located therebelow. The activating trigger is mounted within the finger opening. Various details of the MS 190 scanner housing can be seen in U.S. Pat. No. Des. D281,977, also assigned to the same assignee as this invention.

Operation of the MS190 device is as follows. Upon the actuation of the trigger by the user, and under the control of the microprocessor and associated circuitry in the device, the laser assembly produces a laser beam whose path is directed by the optic assembly and rotating reflective polygon out through an outlet (window) in the housing to impinge upon a bar code disposed opposite the outlet. The rotating reflective polygon sweeps the beam across the bar code. The light reflected off the bar code is of generally uniform spectral distribution so that a portion of it re-enters the housing through the window. From there the reflected light passes through the optic assembly where it is reflected off the rotating polygon and directed to the photodetector. The photodetector and associated amplifier and signal processor forms a part of the signal processing circuitry of the unit which produces digital signals indicative of the make-up of the bar code symbol. The microprocessor and its associated signal processing circuitry decode those signals to provide conventional RS232C signals, e.g., ASCII characters or other conventional serial digital communication signals, via the output connector and cable to any desired peripheral equipment, such as a host computer, an electronic cash register, etc.

The optic bench assembly basically comprises a plurality of mirrors which are oriented to deflect the light in a compact folded path through the unit. In the interest of maintaining critical optical alignment, the mirrors and associated components of the optic bench assembly are rigidly mounted on a support bracket affixed to the front end of the laser tube. The rotating polygon is also mounted on the support bracket. The bracket itself is secured to a printed circuit board or card holding the photodetector, its associated amplifier, and the signal processing circuitry. That circuit board is itself held in place within the housing by a pair of mounting slots forming the inner surface of portions of the walls of the housing. Thus, once the optic assembly is aligned and mounted, it does not utilize the device's housing itself for its support, but only as a nest therefor.

The high voltage supply for the laser is of a conventional, switch mode design, and is in the form of a potted circuit board enclosed in a metal housing or shield located in the rear portion of the plastic housing of the unit.

The laser tube disclosed in my U.S. Pat. No. 4,575,625 is a steel-surround laser tube having a ceramic rear, and an anode portion located within a protective steel encased insulative shield, with a ballast resistor assembly also located within the shield. In early commercial versions of the MS190 device, the steel-surround laser tube was held in place within the handle portion of the housing by plural projections molded into the housing's plastic. This simple mounting arrangement was sufficient from a shock absorbency standpoint, since a steel laser tube exhibits great ruggedness. In the more recent commercial versions of the MS190 device, a glass laser tube has been utilized in lieu of the steel-surround tube. The glass laser tube is, however, located within a protective metal tube and the tube resiliently mounted within the handle portion of the housing by the use of patches of RTV (room temperature vulcanized) rubber material in the interest of shock absorbency.

While the MS190 device has proved very effective for its intended purposes, it still leaves something to be desired from the standpoint of performance (e.g., scanning at a distance), ergonomics (e.g., weight, compactness, balance, ease of manipulation and use, etc.), simplicity and cost of production (e.g., manufacturing, assembling and testing, etc.), and serviceability.

OBJECTS OF THE INVENTION

Accordingly, it is a general object of this invention to provide a hand-held laser scanner which overcomes the disadvantages of the prior art.

It is another object of this invention to provide an ultra-compact, ergonomically designed hand-held laser scanner.

It is still another object of this invention to provide a hand-held laser scanner which is simple in construction.

It is yet another object of this invention to provide a hand-held laser scanner which can be readily manufactured, assembled and tested.

It is yet another object of this invention to provide a laser scanner which is constructed to facilitate ease of service and replaceability of various components.

It is yet another object of this invention to provide a laser scanner which includes various modular subassemblies which can be readily mounted and removed from the housing to facilitate assembly and service.

It is yet another object of this invention to provide a laser scanner which provides better scanning at longer distances than prior art devices.

It is still another object of this invention to provide in a hand-held laser scanner means for adjusting the laser beam width.

SUMMARY OF THE INVENTION

These and other objects of the instant invention are achieved by providing a compact hand-held laser scanner. The scanner comprises a self-contained housing including a hollow, tubular handle portion configured to be readily held within the hand of a person and having a short length body portion projecting outward from the handle portion. The housing has access means to permit access to the interior of the hollow handle portion. The body portion includes a window at the distal end thereof. Laser beam generating means, associated power supply means and first means holding the laser beam generating means and the power supply means together form a replaceable unit for the scanner. The unit is releasably secured within the hollow handle portion and with the laser beam generating means aligned to produce a laser beam and to direct it into the body portion of the housing. Optical means are located within the body portion of the housing for directing the laser beam out through the window.

Other objects and many of the attendant advantages of this invention will be readily appreciated as the same becomes better understood by reference to the following detailed description when considered in connection with the accompanying drawing wherein:

DESCRIPTION OF THE DRAWING

FIG. 4 is a side elevational view, partially in section, of the handle portion of the apparatus shown in FIG. 1; and FIG. 5 is a sectional view taken along line 5—5 of FIG. 4; and FIG. 6 is a plan view of a beam width adjusting/attenuator forming a part of the scanner of FIG. 1.

DETAILED DESCRIPTION OF THE PREFERRED EMBODIMENT

Figure 1:
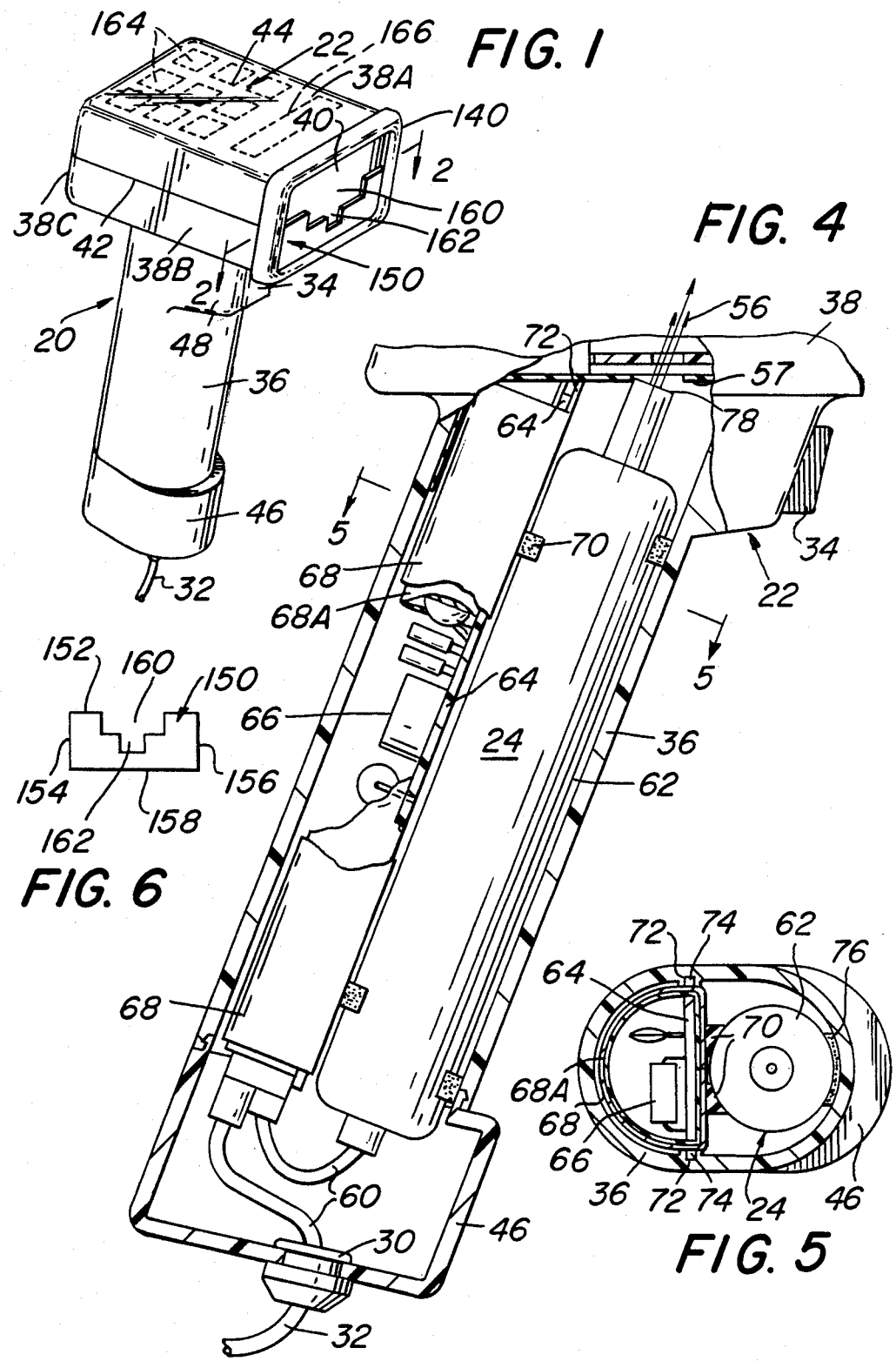
FIG. 1 is a perspective view of a laser scanner constructed in accordance with the present invention.
Figure 3:
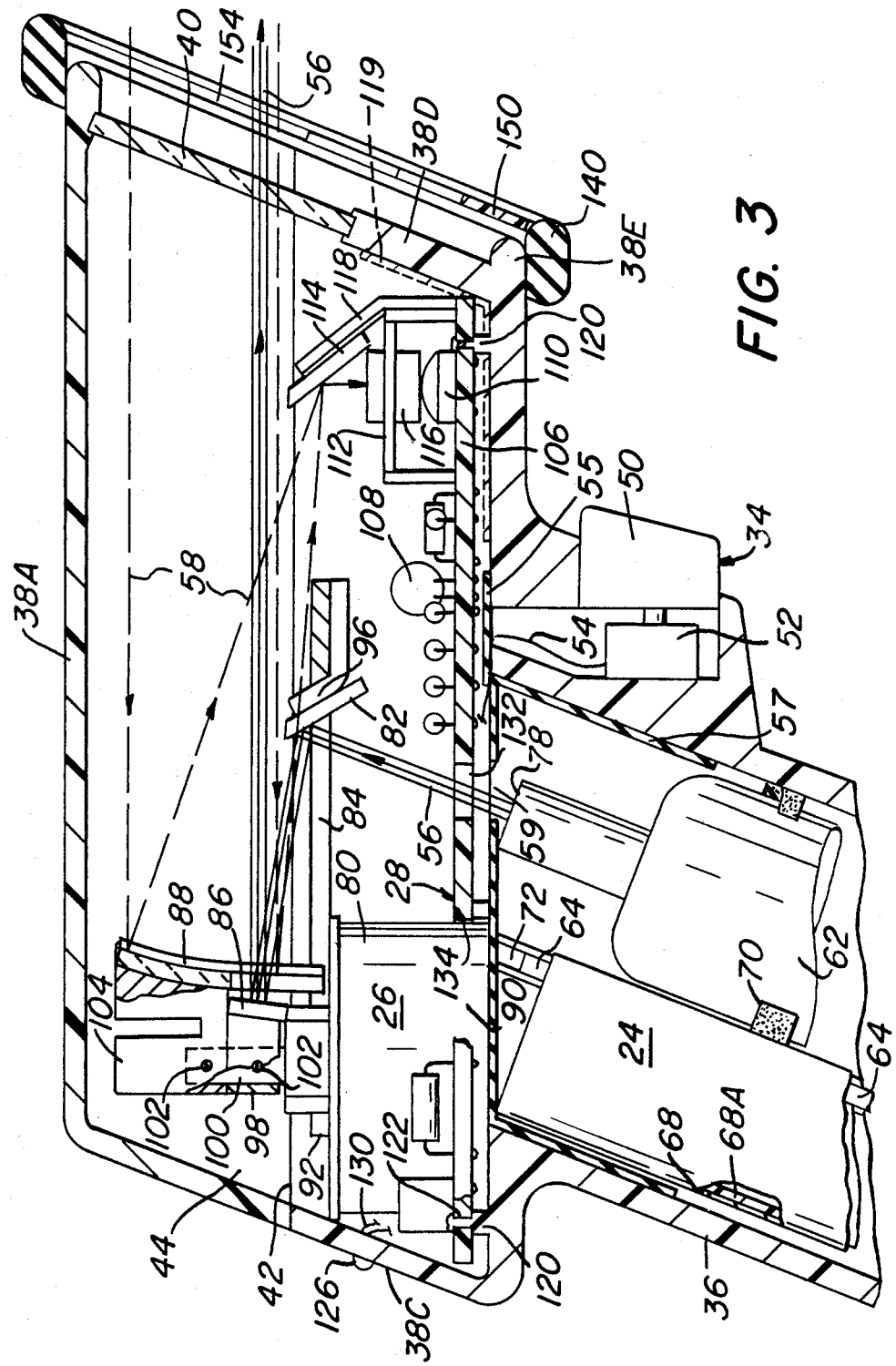
FIG. 3 is a sectional view taken along line 3—3 of FIG. 2.

Referring now in greater detail to the various figures of the drawing and wherein like reference characters refer to like parts, there is shown at 20 in FIG. 1 a portable, hand-held laser scanner device which is completely self-contained and includes means for scanning a bar code, high and low voltage power supplies for the device, decoding circuitry to provide a signal indicative of the information contained in the bar code, and communications circuitry to enable the uploading/downloading of data to and from the device. In particular, the device 20 basically comprises an ultra-compact, ergonomically designed housing 22, a laser tube an associated high voltage power supply subassembly 24 (FIGS. 3 and 4), a beam folding and sweeping optics and motor subassembly 26 (FIG. 3), a photodetector and associated amplification and signal processing circuitry subassembly 28 (FIG. 3), a releasable input/output cable connector or plug 30 (FIG. 4), an associated input/output cable 32 (FIG. 4), and an on/off trigger assembly 34 (FIGS. 1, 3 and 4).

The housing 22 as mentioned above is of ultra-compact size and is ergonomically designed. Moreover, the device is very light in weight. The ultra compact design, which as will be described hereinafter, includes a short snout body portion and a handgrip portion to enhance the balance point of the device, i.e., to put the center of gravity of the device in the operator's hand. Thus, the device can be held comfortably within one's hand for long periods of time without operator fatigue, thereby increasing productivity. To that end, as can be seen in FIG. 1, the housing is of a somewhat modified gun shape, including a cylindrical (or barrel) handgrip portion 36 and a short snout or upper body portion 38. The body portion is of generally parallelopiped shape, including a top wall 38A, an opposed pair of side walls 38B, a rear wall 38C, a front wall 38D (FIG. 3) and a bottom wall 38E. The front wall 38D includes an opening in which a window 40, formed of an anti-reflective, wave-length selective glass, or some other beam transparent material, e.g., plastic, is located. The window serves as the means through which a laser beam produced by the device 22 projects to impinge on the bar code symbol (not shown) and through which reflected light off the symbol is received by the optical components of the device. The entire housing 22 except for two caps (to be described later) is formed as an integral or unified unit, such as by molding, for reasons to be described hereinafter. The integral (unitary) nature of the housing, the composition of the material making up the housing, and the thickness of the housing's bottom wall 38E and contiguous sidewall wall portions of the body and the handgrip ensure that the housing is substantially rigid to resist flexure and bending. Accordingly, as will be described in detail later, the device 20 maintains good alignment of the optical components mounted within the housing and without the need for a separate, rigid optical bench, as has characterized prior art devices.

The laser tube and associated high voltage power supply subassembly 24 is mounted within the housing's handle portion 36, while the other two subassemblies 26 and 28 are mounted within the housing's body portion 38. In order to provide access to the interior of the upper body portion 38, that portion of the housing is split horizontally along a peripheral seam line 42 to provide a removable upper cap or cover 44. Upon removal of the cover 44, access to the beam folding and sweeping optic and motor subassembly 26 and to the photodetector and associated amplifier and signal processor circuitry subassembly 28 is provided. The lower (free end) of the housing's handle portion 36 is closed by a releasbly securable cap 46. The cap 46 is releasably securable in order to provide access to the interior of the handle portion 36 for removal and/or servicing of the laser tube and associated high voltage power supply subassembly 24 located therein.

The trigger assembly 34 is located within a recess in a thickened wall portion 48 of the housing at the interface of the front of the handle portion 36 and the base wall 38E on the underside of the body portion 38. The trigger assembly is isolated from potentially high voltages on the nearby laser power supply subassembly 24 by an electrically insulating barrier 49. The barrier consists of a thickened wall portion of the housing's hand grip portion. The trigger assembly 34 basically comprises a depressable button 50 mounted onto the actuator of a conventional push-button electrical switch 52. The switch is, in turn, electrically interconnected to a connector (not shown) forming a portion of the subassembly 28, via conductors 54. A plate 55 formed of an electrically insulated material is mounted over the opening through which the conductors 54 extend. A rubber cover 57 is mounted over the top end of the high voltage power supply subassembly 24. The plate 55 and cover 57 serve as additional electrical isolation means, while the plate also serves as a moisture seal.

When the trigger button 50 is depressed, an electrical signal is provided to the circuitry to turn the device on, i.e., initiate a scanning operation. To that end, the depressing of the switch causes the laser beam generating means (e.g., laser tube or solid state laser) of the assembly 24 to produce a laser beam. The laser beam is directed out of the housing's handle portion 36 through an opening 59 in the insulating cover 57 into the housing's body portion 38 where it is folded by optical components (to be described later) and directed to beam sweeping means (also to be described later), all forming a portion of the subassembly 26. The beam sweeping means sweeps the beam through an arcuate path and directs it out through the front window 40 to impinge upon a bar code symbol (not shown) disposed some distance, e.g., 0 to 30 inches (76 cm), away from the window. The path of the exiting laser beam is denoted by the broken arrows identified by the reference numeral 56. The operation of the beam sweeping means, as will be described later, causes the beam to sequentially traverse across the bar code in a single direction. The laser beam is thus reflected by the bar code's bars and spaces to a generally uniform spectral distribution so that a portion of the reflected light enters back through the window 40 in the path shown by the broken line return arrows denoted by the reference numeral 58. This returning light is directed through various optical components to a photodetector, to be described later, forming a portion of the subassembly 28.

The subassembly 28 comprises a high gain preamplifier (not shown) and an amplifier (not shown) connected to the output of the photodetector to serve as an input to signal processing circuitry of the subassembly 28. The photodetector and its associated preamplifier, amplifier and signal processing circuitry are mounted on a printed circuit board, to be described later. The signal processing circuitry produces digital signals indicative of the make-up of the bar code symbol scanner. These signals are conventional "TTL type" logic signals of from zero to five volts and are decoded by a microprocessor and associated components of signal processing circuitry which are also mounted on the printed circuit board, to provide conventional RS232C signals (e.g., ASCII characters) via the output connector 30 and the associated cable 32 to any desired peripheral equipment, such as a host computer, an electronic cash register, a memory bank, a modem, a printer, etc. Moreover, the output signals can be extended up to 288 kilobaud and may be used for light pen emulation.

The device 20 is capable of scanning at a very fast scan rate, e.g., 35–70 scans per second, for decoding various conventional bar codes, e.g., UPC, Type A, D, E, EAN, etc., located from 0 to 20 inches (51 cm) from the window 40. Lower density symbols can be scanned out to 40 inches (102 cm). The width of the scan field is approximately 1.7 inches (4.3 cm) at the window 40 and 12 inches (30 cm) at a distance of 15 inches (38 cm) from the window. The depth of field is quite deep, e.g., 40 inches (102 cm), depending upon the width and size of the bar codes.

The device 20 is light in weight, e.g., approximately 12 ounces (340 gms), and extremely compact in size, e.g., the body portion is approximately 3.65 inches (9.3 cm) long by 2 inches (5.1 cm) wide. The height of the entire device from its top wall to the bottom of the handle portion is approximately 7.85 inches (19.9 cm) long. The handle portion is approximately 1.1 inches (27 cm) thick and 1.5 inches (38 cm) wide.

Power for the device 20 is provided by either a 115 volt AC power pack (not shown), or a 24 volt battery-powered pack (not shown) including rechargeable batteries, or by plus 12 volts DC from a host terminal (not shown), via the cable 32. In the embodiment shown herein, the device 20 is powered by the plus 12 volts DC from the host terminal, via a pair of electrical conductors (not shown) in the cable 32, and an associated pair of conductors (not shown) in a wiring harness 60 extending in the handle portion 36. These conductors are connected to a conventional releasable electrical connector (not shown) forming a portion of the high voltage power supply (to be described later) portion of the subassembly 24. This releasable connection enables the wiring harness connectors to be readily disconnected from the high voltage power supply to enable the subassembly 24 to be readily removed from the housing for service or replacement. The cable 32 also serves as the means for grounding the components of the device 20 as well as providing the means for carrying data signals between the device 20 and any device to which it is connected. To that end, cable 32 includes plural additional conductors (not shown) which are electrically connected to plural additional conductors (not shown) in the wiring harness 60, when the cable 32 is connected to the housing via plug 30.

The details of the construction of the laser tube and associated high voltage power supply subassembly 24 will now be described with reference to FIGS. 3, 4 and 5. Thus, as can be seen therein, the subassembly 24 basically comprises a conventional glass laser tube 62, a printed circuit board or card 64, and a high voltage power supply 66 of conventional, switch-mode design. The laser tube is fixedly secured onto one side of the printed circuit card while the components forming the high voltage power supply are mounted on the other side of the card. Also mounted on the same side of the printed circuit card as the high voltage power supply is a conventional ballast resistor assembly (not shown). A shield formed of a laminated sheet of an electrically conductive material, e.g., copper, 68 layer and an electrically insulative material, e.g., Mylar, layer 68A is wrapped around the high voltage power supply components and the printed circuit card, i.e., it extends around the underside of the printed circuit card 64 as shown in FIGS. 4 and 5. The shield is grounded by means (not shown) connected to the copper layer. The electrically insulative layer 68A on the underside of the laminated shield ensures that when the shield is extended in place around the components and the card, none of the components are shorted to ground.

The laser tube is mounted onto the outside of a portion of the copper layer of the shield 68 which extends around the bottom of the card 64. Such mounting is accomplished via plural patches of either foam tape or RTV adhesive 78 interposed between the shield and the tube. The patches 68 also serve as shock absorbers so that the laser tube once mounted is resistant to shock, e.g., is restrained from sudden decellerations due to dropping. Additional patches 76 of resilient foam and/or RTV material can be interposed between the inner surface of the walls forming the housing's handle 36 and the outer surface of the laser tube assembly to further enhance shock absorbency. With such a construction the laser tube can withstand 140G's or better.

The laser tube/power supply subassembly 24 is rigidly mounted within the handle portion 36 as follows: as can be seen in FIG. 5, the inner wall of the handle portion 36 includes an opposed pair of elongated recesses 72 extending parallel to the longitudinal axis of the handle portion 36. The opposed side edges of the printed circuit board 64 include at least two spaced apart, ears or tabs 74 which are configured to be disposed within the longitudinally extending recesses 72. To that end, all that is required to effect the placement and mounting of the subassembly 24 within the handle portion 36 is to remove cap 46 to expose the interior of the handle portion. The subassembly 24 can then be slid into the handle with the printed circuit card tabs 74 sliding along the recesses or grooves 72 until the subassembly is fully in its operative position shown in FIG. 4. Once the electrical connections to the wiring harness 60 and associated conductors is accomplished the cap 46 is thereafter snapped in place.

The laser tube 62 is of conventional construction and includes a laser light emitting end face 78, which is preferably ground to focus the laser beam. Alternatively, additionally beam focusing optics (not shown) may be mounted adjacent the tube's end 48 to accomplish the beam focusing function.

It must be pointed out at this juncture that the device 20 of the subject invention is not limited to conventional helium-neon lasers, but can also be utilized with solid state, e.g., infrared, lasers. Such lasers are considerably smaller and more energy efficient, as well as lighter in weight and more rugged than helium neon laser tubes. In addition, such lasers can be readily mounted with their associated components on a circuit board in the handle portion 36 without requiring any modification of the housing portion. In either case, the laser beam is produced within the handle portion 36 and projects outward therefrom into the interior of the body portion 38 as shown by the arrows 56 in FIG. 4.

As will be appreciated from the discussion to follow, when the subassemblies 24, 26 and 28 are mounted within the housing 22, the handle portion 36 can be deflected slightly with respect to the body portion 38, yet the laser beam will still be directed by the optical components to follow the predetermined path for effective scanning operations. Moreover, thermal distortions of the housing will also have no significant detrimental effect to the operation of the device, e.g., the path of the beam through the housing. To accomplish that end the housing is formed of a relatively rigid, rugged and tough plastic, such as polycarbonate sold by General Electric Company under the designation LEXAN. Moreover, the printed circuit board 64 holding the high voltage power supply and laser tube subassembly 24 is configured to fit tightly within the grooves 72 to enhance the accurate positioning of the tube, and hence accurate aiming of the beam. In addition, the various optic elements forming the optical bench (to be described hereinafter) of the device are mounted on their respective subassemblies 26 and 28 in critical alignment with one another. However, the subassemblies themselves need not be as critically aligned with each other in the housing. Thus, the housing being a single molded entity of stiff construction is of sufficient rigidity and construction to hold the subassemblies in sufficient alignment with one another that any deflections of the handle or thermal distortions of the housing will have no significant effect on the desired path of the exiting laser beam or incoming light returning from the scanned symbol.

The motor at 80 is a conventional stepper type motor, which includes a housing 90 fixedly mounted within the body portion 38 of the housing 22. In this connection, the motor's housing 90 is positioned on the bottom wall of the body portion 38 adjacent the back wall 38C. The precise position of the motor is maintained by plural positioning studs (not shown) projecting upward from the housing. The motor is adhesively secured in place.

Figure 2:
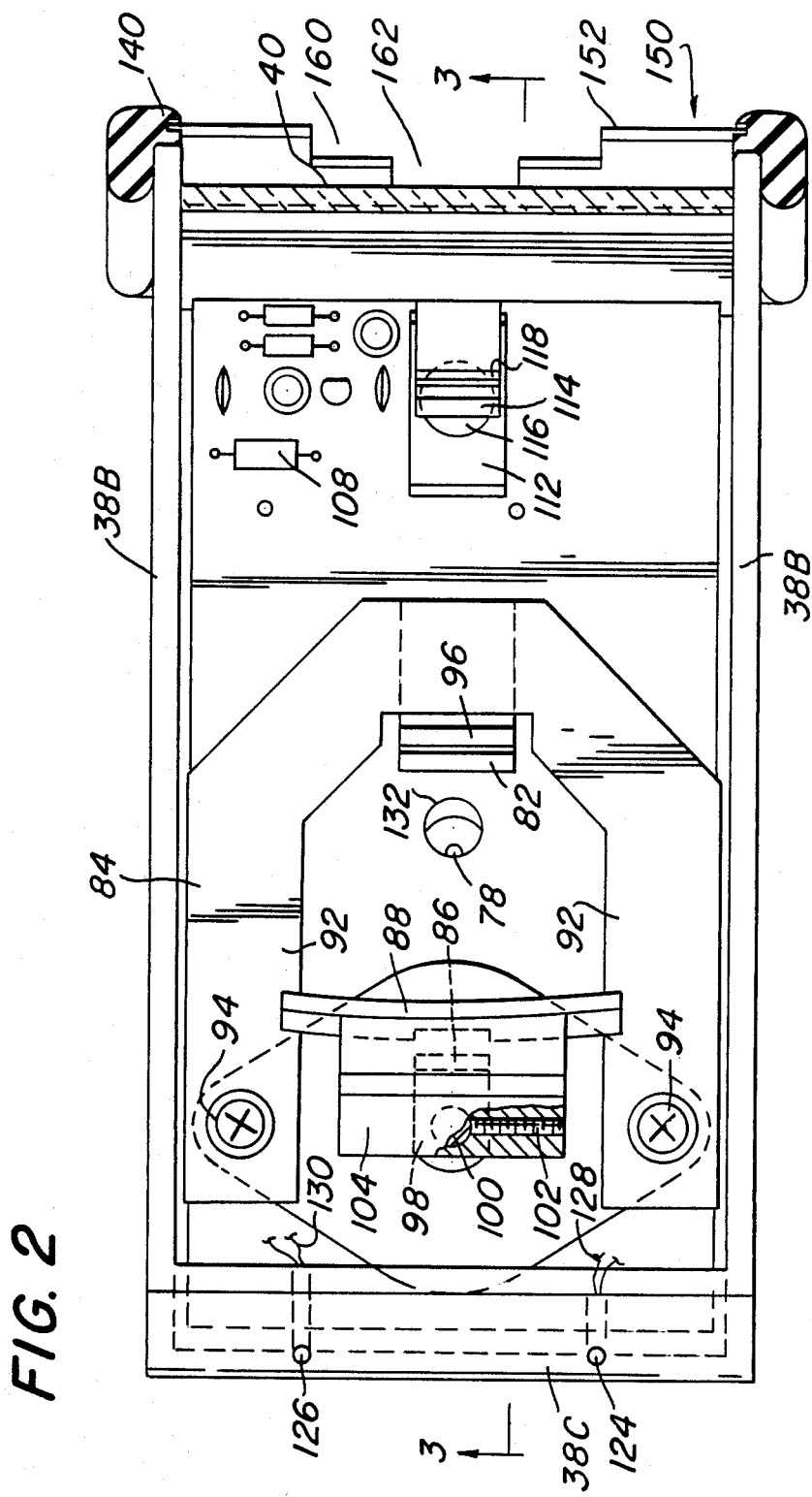
FIG. 2 is an enlarged sectional view taken along line 2—2 of FIG. 1.

Mounted on top of the motor's housing 90 is the heretofore identified mounting bracket 84. As can be seen in FIGS. 2 and 3, the bracket 84 is a generally planar member which in a plan view is of a generally V-shape (see FIG. 2). The plate includes a pair of legs 92, each of which is releasably secured to the top of the motor housing 90, via respective threaded fasteners 94. At the apex of bracket 84 is an angled flange 96. The flange includes a portion extending at approximately a 45 degree angle to the plane of the bracket 84. Mounted on the inside surface of the angled portion of the flange 96 is the heretofore identified deflecting mirror 82. The mirror 82 serves to deflect the laser beam 56 from the tube 62 toward the beam sweeping (outgoing) mirror 86. That mirror is of generally planar shape (but may be concave) and serves as a beam shaping element. By using the outgoing mirror as a beam shaping element secondary beams which would normally come off lenses used in prior art scanners to shape the beam are eliminated. The outgoing mirror 86 is mounted, via a bracket 98, and associated set screw 102 on the output shaft 100 of the motor 80. The output shaft 100 is arranged to be reciprocated through an arc of approximately 14°-22° (i.e., plus or minus 7°-11° from a neutral central position in which the mirror 86 is aimed in a direction longitudinally down the center of the body portion of the housing toward the window 40) when the motor is operated. Thus, the swept laser beam 56 exits through window 40 to sweep across any bar code brought into its path. The returning light from the bar code, as earlier identified by the reference numeral 58, impinges on the receiving (collecting) mirror 88. The collecting or incoming mirror 88 is spherical so that it will focus the light for receipt by the photodetecting means of the subassembly 28. The radius of curvature of mirror 88 is preferably quite large, so that its focal length is on the order of 100 millimeters or more. The spherical receiving mirror 88 is mounted on a bracket 104. Thus, the beam is focused by the spherical mirror 88 to a point within the housing at which an incoming light directing mirror (to be described later) is mounted for directing the focused beam to the photodetector. The bracket 104 on which the receiving mirror 88 is mounted is, in turn, mounted on the motor's output shaft 100 via another set screw 102. By placing the collecting mirror 88 on the same shaft 100 as the output mirror 86, the light return path is opened up so that the optical components of the device are easy to design and implement.

The details of the signal processor circuitry and associated component subassembly 28 will now be described with reference to FIGS. 2 and 3. As can be seen therein, that subassembly basically comprises a printed circuit board 106 on which is mounted various electrical components 108 of the system, as well as a light-receiving photodetector 110, a box-like filter shroud and mounting bracket subassembly 112, and an incoming light deflecting mirror 114. The components 108 will not be described in detail herein. Suffice to state that such components are constructed generally in accordance with the teachings of my aforementioned U.S. Pat. No. 4,575,625, whose disclosure is incorporated by reference herein. Thus, the components 108 basically comprise a very high gain photocell preamplifier and associated amplifier, the microprocessor and the various associated signal processing circuitry, as well as the low voltage power supply for the device 20. The photodetector 110 basically comprises a conventional photocell whose output is connected to the very high gain preamplifier which, with its associated amplifier, forms the front end of the signal processor circuitry 108. In order to ensure that only light of a given wavelength, that is, the wavelength of the laser light, reaches the photocell 110, the photocell 110 is located within the box or shroud 112. The box or shroud is mounted on the top surface of the front end of the printed circuit board or card 106 and completely encloses the photocell. A conventional band pass filter 116 is mounted within an opening (not shown) in the box 112 and disposed over the photocell 110. The filter is designed to have a band pass for the wavelength of the particular laser beam. Thus, if the laser is a helium-neon laser, the filter has a band pass for radiation at a wavelength of 633 nanometers. If a solid state laser is utilized in lieu of the helium-neon laser, the filter 116 is selected to have a band pass for the wavelength of the infrared radiation, e.g., 780 nanometers. Alternatively, the filter (as well as the optical components of the system) can be designed to provide a wide band pass to cover wavelengths from 633 nanometers to 780 nanometers so that either a helium-neon laser or solid state, e.g., infrared, laser can be used without necessitating a change in the filter and optical components. The incoming light deflecting mirror 114 is mounted on a bracket 118 located on the front end of the box 112. The bracket 118 serves to shield or shroud the filter, and hence the photocell 110 located therebelow, from ambient light entering the window 40. Thus, only the focused light reflected off spherical mirror 88 can enter into the box 112 through the filter 116 to be received by the photocell 110. This action has the effect of preventing light which can enter through the window 40 from saturating the photocell.

The box 112 is preferably formed of an electrically conductive material, e.g., metal, to provide electrical shielding to prevent noise from being picked up by the very high gain photocell preamplifier at the front end of the signal processing circuitry. Moreover, the housing 22, itself, may be electrically conductive to prevent radiation from the laser power supply into the photocell preamplifier. The conductive housing 22 also serves to prevent the emanation of RF interference from the device 20. In such an embodiment of the housing the LEXAN may include nickel particles and is grounded via means (not shown).

An alternative mounting arrangement may be used for the photocell 110 and filter 116. Thus, the photocell may be mounted somewhat vertically on board 106 facing the collecting mirror 88 of the device. A metal box or shroud (somewhat similar to box 112) covers the photocell and mounts the filter 116 next to the photocell in the path of the incoming light from mirror 88. This arrangement eliminates the need for mirror 114 and its mounting bracket. The shroud-like box 112 described heretofore, serves to block out all other light. A copper foil, electrically grounded shield 119 (shown by the phantom lines in FIG. 3) is provided under the front end of the board 106 and on the inner surface of front wall 38D to prevent the diode and its associated preamplifier from picking up high frequency emanations from the high voltage power supply. The metal shroud surrounding the photocell also aids in electrically shielding the photocell and preapli- fier.

The signal processing circuit board 106 is held fixedly in position within the body 38 of the housing 22 via the use of plural positioning studs 120. These studs project upward from the inner surface of the bottom wall 38E of the housing and extend through associated openings 122 in the printed circuit board 106. The top end of each stud is deformed to hold the circuit board fixedly in place thereon.

The electrical interconnection from the conductors 54 associated with the trigger 34 and various other conductors forming a portion of the wiring harness 60 are effected through releasably securable connectors (not shown) which are also mounted on the printed circuit board 106.

As can be seen in FIGS. 2 and 3, the device also includes two light emitting diodes 124 and 126. The light emitting diodes are mounted in openings in the back wall 38C of the body portion of the housing. The LED 124 is connected, via conductors 128, to the signal processor circuitry 108 so that it is illuminated whenever the trigger is depressed. This action indicates that the device is powered and is in the "scan mode" of operation. The other LED 126 is connected, via conductors 130, to the signal processing circuitry and is arranged to be illuminated when the circuitry of the signal processing board has decoded the bar code symbol scanned.

Inasmuch as the printed circuit board 106 is mounted on the bottom of the body portion of the housing it includes a central opening 132 through which the laser beam 56 passes from the laser tube 62 to the beam deflecting mirror 82. The printed circuit board 106 also includes a large opening 134 through which the housing 90 of motor 80 passes.

The under surface of the printed circuit board 106 may include an electrically insulative facing (not shown) and having an electrically conductive layer (not shown) on the outside thereof to serve as a ground plane to provide better grounding than through the plastic of the housing itself.

It should be pointed out at this juncture that the photodetector, e.g., photocell 110, need not be mounted on the printed circuit card 106 as described above, but may, in fact, be located within the housing adjacent window 40 in the line of sight of the spherical (incoming) mirror 88 or may be located to the sides of the upper portion of the housing. Moreover, the mirror 88 need not be located within the rear portion of the body 38 of the housing as shown in FIG. 3, but can be located closer to the front window. However, by placing the mirror at the rear of the body portion, one is able to utilize a larger radius of curvature for the mirror, thereby decreasing production costs (a large radius spherical mirror is easier and cheaper to produce than a mirror of substantially smaller focal length which would be necessary if the mirror 88 was located at the front of the housing adjacent the photodetector).

As shown clearly in FIG. 1 the front end of the device 20 includes a bumper 140 surrounding the window 40. The bumper is preferably formed of a resilient material, such as rubber, to serve as a shock absorber to protect the device in case it is dropped on its front end.

The bumper 140 also serves as a means for mounting a beam width adjusting/attenuating component 150 of the device 20 and which will now be described. In this connection, as noted earlier, the device 20 projects a relatively wide laser beam out of the window 40. While a wide beam is an extremely desirable feature for most scanning applications, it is undesirable for some applications. With respect to the latter, in some applications, such as scanning individual packages in a crowded shopping cart, it is desirable to have a more narrow beam width so that the beam can be aimed at only a single particular symbol out of a group of symbols which may be in close proximity to one another. Thus, the beam width adjusting/attenuating component comprises a movable shroud or curtain. The curtain is mounted within the bumper 140 and is arranged to be moved to various positions to selectively cover portions of the window from which the laser beam exits and thereby adjust the width of the beam from a full width to an intermediate width to a narrow width. The curtain is also arranged to totally block the beam, when desired. Thus, depending upon the position of the curtain with respect to the window it enables the beam to exit the device unimpeded (so that the full width beam is available for use) or to cover selective marginal portions of the beam to enable only selected width portions of the beam to exit the device (whereupon precise aiming discrimination can be accomplished), or to completely block the beam from exiting the device. The latter arrangement of the curtain is used to fulfill the requirements of the Food and Drug Administration's Consumer Division for Radiation Health requirements for a shutter or attenuator to prevent the laser beam from exiting the device.

As can be seen in FIG. 6, the curtain 150 basically comprises a generally planar plate having a top edge 152, a pair of side edges 154 and 156, and a bottom edge 158. Extending into the center of the top edge of the curtain is an enlarged width slot 160. A second or narrow width slot 162 extends into the center of the bottom edge of the slot 160.

The curtain 150 is mounted over the front wall 38D of the housing with its edges 154 and 156 located within respective channels 164 (FIG. 3) in the inner sides of the bumper 140 adjacent the sidewalls of the housing. The curtain 150 is arranged to be slid within those channels to various positions (heights) with respect to the window 40 to effect the adjustment and/or attenuation (blockage) of the beam. Thus, the width of narrow slot 162 is selected so that when the curtain is in the vertical position with the slot 162 in front of the portion of the window from which the beam exits, the curtain blocks off a sufficient portion of the marginal ends of the beam as it sweeps back and forth, thereby producing a relatively narrow width beam suitable for precise aiming at a desired symbol. The width of slot 160 is greater than that of slot 162 so that when the curtain is in a slightly lower vertical position with the slot 160 disposed over the portion of the window from which the beam exits, the curtain blocks off less of the marginal ends of the beam to thereby produce a beam of intermediate width. When the curtain is in the lowermost position within the channels, like that shown in FIG. 1, no portion of the curtain blocks the beam so that the beam exits unimpeded to result in a full width scan line. The curtain is arranged so that it can be slid to an uppermost position within the channels 164, whereupon the curtain fully covers the portion of the window from which the beam would otherwise exit to thereby completely block the beam.

In FIG. 1 there is shown, via phantom lines in the top wall of the housing 22, a plurality of keys 164. These keys form a keyboard assembly which may be utilized in an alternative embodiment of the device 20 as described heretofore. In such an embodiment data and/or instructions can be entered into the device by the appropriate actuation of the keys. A visual display panel 166, such as an alpha-numeric LCD display, is preferably utilized to display desired data or input instructions in such an embodiment. Additional memory means (not shown) may be included in the device in the furtherance of the foregoing alternative embodiment.

As will be appreciated from the foregoing, the housing of the subject invention is ergonomically almost optimum, such that when one picks up the device in one's hand, there is a natural match. In this connection, the handle part is sufficiently long so that one can readily grip it with the bottom surfaces of the body portion resting on the top of one's hand and with the linear top wall of the body portion serving as distinctly delineated means for effecting the aiming of the laser beam at the bar code to be scanned.

Moreover, the bottom cap of the handle is made modular so that one can adapt the unit to various cable configurations and input voltage configurations.

Furtherstill, the device's signal processing and associated components, and its motor and associated optical components are in the form of modular subassemblies which are readily accessible for assembly, service and replacement through the top of the housing by removing the cap 44. So too, the laser tube and associated power supply components form a modular assembly which is readily accessible through the bottom of the handle portion of the housing by removing the cap 46. Thus, manufacture, assembly, testing and service of the device 20 can be accomplished quite easily.

Without further elaboration, the foregoing will so fully illustrate my invention that others may, by applying current or future knowledge, adopt the same for use under various conditions of service.

What is claimed is:

1. A compact laser scanning apparatus comprising:
   (a) a self-contained housing including an elongate hollow tubular handle portion configured to be readily held within the hand of a person and a short length hollow body portion projection generally transversely outward from said handle portion and having a distal end, said handle portion having access means to permit access to the interior of said hollow handle portion, said body portion having a window at the distal end thereof;
   (b) laser beam generating means, associated power supply means, and first means securing said laser beam generating means and said power supply means together to form a replaceable unit, said unit being located within said hollow handle portion, said unit being releasably secured within said hollow handle portion and arranged to be removed as a unit from said hollow handle portion via said access means, said laser beam generating means producing a laser beam and directing it into said body portion of said housing; and (c) optical means located within said body portion of said housing and supported thereby for directing said laser beam out through said window, whereupon a compact laser scanning apparatus is provided which enables the ready replacement of said unit without subjecting the optical components located within said body portion to injury.

2. The compact laser scanning apparatus of claim 1 wherein said first means comprises a first printed circuit board on which said power supply means are located and to which said laser beam generating means is secured.

3. The compact laser scanning apparatus of claim 2 wherein said hollow handle portion includes an inner surface and wherein said inner surface comprises at least one slot for receipt of an edge portion of said first printed circuit board.

4. The compact laser scanning apparatus of claim 1 wherein said laser beam generating means comprises a laser tube.

5. The compact laser scanning apparatus of claim 1 wherein said laser beam generating means comprises a solid state laser.

6. The compact laser scanning apparatus of claim 3 wherein said laser beam generating means comprises a laser tube.

7. The compact laser scanning apparatus of claim 3 wherein said laser beam generating means comprises a solid state laser.

8. The compact laser scanning apparatus of claim 1 wherein a strip of electrically conductive material is wrapped about said power supply means and said first printed circuit board.

9. The compact laser scanning apparatus of claim 1 additionally comprising:

(d) signal processing means located on a second printed circuit board, said second printed circuit board being mounted within said body portion of said housing.

10. The compact laser scanning apparatus of claim 9 wherein said optical means comprises at least one component mounted on said second printed circuit board.

11. The compact laser scanning apparatus of claim 9 wherein said body portion of said housing includes a wall portion and wherein said second printed circuit board is mounted directly on said wall portion.

12. The compact laser scanning apparatus of claim 1 wherein said optical means comprises movable reflecting means for sweeping said beam in a path through said window and motor means for moving said beam sweeping means.

13. The compact laser scanning apparatus of claim 12 wherein said motor and said optical means are mounted in said body portion.

14. The compact laser scanner of claim 13 additionally comprising signal processing means located on a second printed circuit board, said second printed circuit board being mounted within said body portion of said housing.

15. The compact laser scanning apparatus of claim 13 wherein said beam sweeping means comprises a first mirror and wherein said first mirror is mounted on an output shaft of said motor means.

16. The compact laser scanning apparatus of claim 15 wherein said optical means additionally comprises reflected light receiving means for receiving laser light reflected off a bar code disposed opposite said window.

17. The compact laser scanning apparatus of claim 16 wherein said reflect light receiving means comprises a second mirror mounted on said output shaft of said motor means.

18. The compact laser scanning apparatus of claim 17 wherein said signal processing means is located on a second printed circuit board, said second printed circuit board being mounted within said body portion of said housing.

19. The compact laser scanning apparatus of claim 18 wherein said optical means comprises at least one component mounted on said second printed circuit board.

20. The compact laser scanning apparatus of claim 1 wherein said handle portion includes a free end and wherein said access means comprises an opening located at said free end of said handle portion and releasably securable cap means therefor.

21. The compact laser scanning apparatus of claim 20 wherein said first means comprises a first printed circuit board on which said power supply means and said laser beam generating means are secured.

22. The compact laser scanning apparatus of claim 21 wherein said hollow handle portion includes an inner surface and wherein said inner surface comprises at least one slot for receipt of an edge portion of said first printed circuit board.

23. The compact laser scanning apparatus of claim 1 additionally comprising signal processing means, said signal processing means comprising at least one photocell and wherein said photocell is disposed within a sealed enclosure disposed within said body portion of said housing adjacent said window, said enclosure serving to shield said photocell from ambient light entering said window.

24. The compact laser scanning apparatus of claim 23 wherein said enclosure includes an opening therein having filtering means disposed within said opening and preventing light other than that defined by a predetermined frequency range from gaining ingress to said photocell.

25. The compact laser scanning apparatus of claim 24 wherein said signal processing means also comprises a printed circuit board mounted within said body portion of said housing.

26. The compact laser scanning apparatus of claim 1 additionally comprising keyboard means located on said housing.

27. The compact laser scanning apparatus of claim 26 additionally comprising display means located on said housing.

28. The compact laser scanning apparatus of claim 27 wherein said housing includes a top wall portion and wherein said keyboard means and said display means are both located on said top wall portion.

29. The compact laser scanning apparatus of claim 26 additionally comprising memory means located within said housing.

30. The compact laser scanning apparatus of claim 1 wherein said window includes means for adjusting the width of said laser beam.

31. The compact laser scanning apparatus of claim 30 wherein said adjusting means is also adapted to block off said beam.

32. The compact laser scanning apparatus of claim 31 wherein said adjusting means comprises a curtain having at least one opening therein, said curtain being arranged to be disposed over said window.

33. The compact laser scanning apparatus of claim 32 wherein said housing includes means for supporting said curtain to enable said curtain to be slid to various positions with respect to said window.

34. The compact laser scanning apparatus of claim 33 wherein said adjusting means comprises a curtain arranged to be selectively disposed over said window.

35. The compact laser scanning apparatus of claim 34 wherein said curtain comprises a plate slideable with respect to said window so that in one position the full width of the beam is allowed to exit from said window while in another position only a selected portion of the width of said beam is allowed to exit said window.

36. The compact laser scanning apparatus of claim 35 wherein said plate is adjustable to yet another position wherein it completely blocks the laser beam from exiting said window.

37. The compact laser scanning apparatus of claim 36 wherein said housing includes a shock absorbing bumper disposed adjacent said window, said bumper serving as a means for supporting said plate at said various positions with respect to said window.

38. The compact laser scanning apparatus of claim 30 wherein said adjusting means comprises a curtain having at least one opening therein, said curtain being arranged to be disposed over said window.

39. The compact laser scanning apparatus of claim 38 wherein said housing includes means for supporting said curtain to enable said curtain to be slid to various positions with respect to said window.

40. A compact laser scanning apparatus comprising a self-contained housing including a handle portion configured to be readily held within the hand of a person and having a body portion projecting outward from said handle portion, said body portion having a window at the distal end thereof, laser beam generating means, associated power supply means and optical means, all being located within said housing for producing a laser beam and directing said laser beam out through said window, and adjusting means mounted adjacent said window for selectably changing the width of said beam that extends out of said window.

* * * * *